United States Patent [19]

Klein et al.

[11] 4,143,271
[45] Mar. 6, 1979

[54] NUCLEAR IMAGING DEVICE WITH IMPROVED LINEARITY

[75] Inventors: Yitzhak Klein, Kiryat Yam, Haifa; Dan Inbar, Haifa, both of Israel

[73] Assignee: Elscint Ltd., Haifa, Israel

[21] Appl. No.: 723,432

[22] Filed: Sep. 14, 1976

[30] Foreign Application Priority Data

Sep. 17, 1975 [IL] Israel ........................................ 48112

[51] Int. Cl.² ............................................. G01T 1/20
[52] U.S. Cl. ..................................... 250/368; 250/366
[58] Field of Search ............................... 250/368, 366

[56] References Cited

U.S. PATENT DOCUMENTS

| Re. 28,571 | 10/1975 | Lange | 250/368 |
| 3,102,955 | 9/1963 | Carlson | 250/368 |
| 3,859,531 | 1/1975 | Van Dijk | 250/368 |

*Primary Examiner*—Harold A. Dixon

*Attorney, Agent, or Firm*—Donald M. Sandler

[57] ABSTRACT

Light coupling means interposed between the photosensitive surfaces of an array of photodetectors and a scintillation crystal has a recess associated with at least one of the photodetectors, the recess being located in the light coupling means within the volumetric projection of the photosensitive surface of said at least one of the photodetectors. The recess is filled with material having an index of refraction different from the index of refraction of the light coupling means such that the index, throughout the recess, is uniform. The provision of the material with a different index in the recess serves to alter the direction of light from a light event in the crystal as the light passes through the light coupling means thereby modifying the relative amount of light received by each of the photodetectors of the array, and thereby improving spatial linearity, uniformity and resolution.

4 Claims, 4 Drawing Figures

U.S. Patent     Mar. 6, 1979     4,143,271
FIG. 1
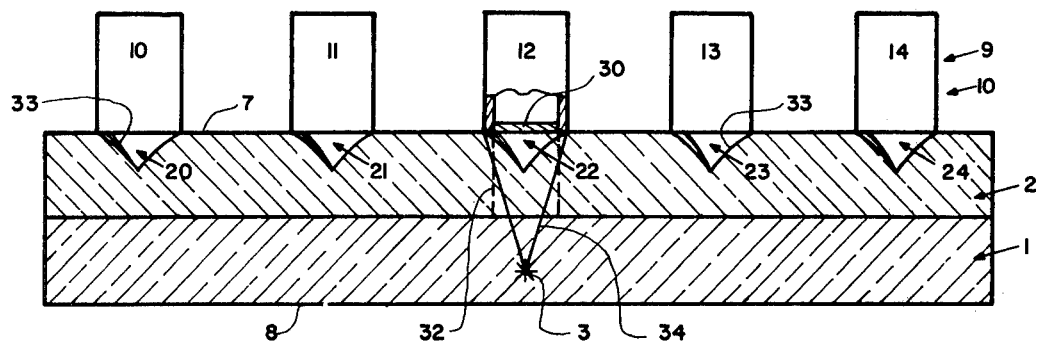
FIG. 2
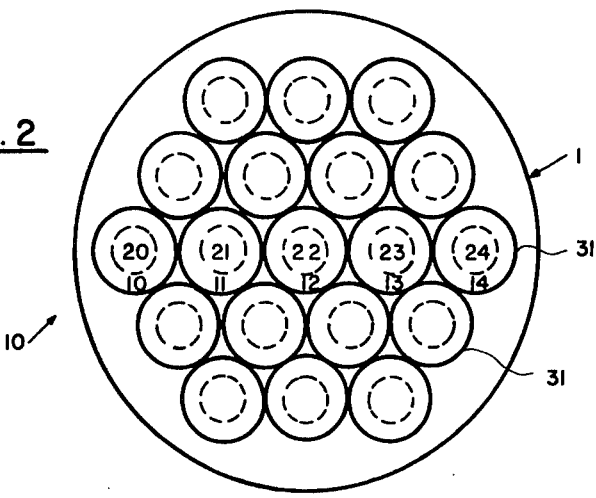
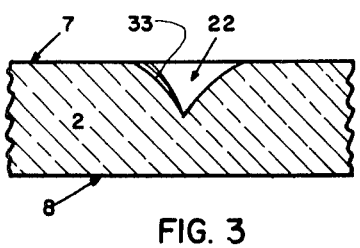
FIG. 3
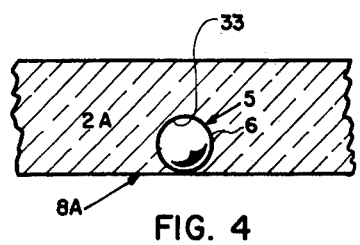
FIG. 4

NUCLEAR IMAGING DEVICE WITH IMPROVED LINEARITY

BACKGROUND OF THE INVENTION

This invention relates to a nuclear imaging device, e.g., a gamma-camera of the type disclosed in Anger U.S. Pat. No. 3,011,057, and more particularly, to a nuclear imaging device designed to reduce spatial non-linearity.

The head of a typical Anger-type gamma camera comprises a scintillation crystal responsive to radiation stimuli for producing light events at spatial locations corresponding to the locations at which the stimuli interact with the crystal, and an array of photomultiplier tubes positioned with their photocathodes facing the crystal and arranged in a hexagonal pattern. Interposed between the array of photomultiplier tubes and the crystal is a transparent light coupling means comprising a glass sheet covering the crystal and a light pipe of plastic material. Typically, nineteen photomultiplier tubes are arranged in a 3-4-5-4-3 hexagonal pattern. The photomultiplier tubes have overlapping fields of view with the result that a light event occurring anywhere in the crystal is detected by a plurality of the photomultipliers. Those photomultipliers close to the light event will respond by producing an output signal of greater amplitude than the amplitude of the output signals produced by photomultipliers more remote from a light event. The coordinates of a light event can be computed by processing the output signals produced as a consequence of the light event in accordance with different procedures that are well known in the art. For example, the processing can be in the manner disclosed in U.S. Pat. No. 3,011,057 or in the manner disclosed in copending application Ser. No. 503,767 filed Sept. 6, 1974 now U.S. Pat. No. 4,060,730 issued Nov. 29, 1977.

A basic problem with a gamma camera of the type described above arises from the spatial non-linearity in converting light events into position coordinate electrical signals. This problem is manifested in the flood image obtained by uniformly illuminating the crystal. Such image should be uniform but, in actuality, the image contains so-called "hot spots" wherein the image is brighter within the spots as compared to their surrounding regions. These spots are located symmetrically about the optical axes of the photomultiplier tubes. Moreover, the phenomenon is most pronounced in the central region of the crystal.

Because of the spatial non-linearity of gamma cameras, the computed coordinates of a light event occurring in the central portion of the crystal and within the volumetric projection of the photocathode of a photomultiplier will be displaced from the actual location of the light event in a direction toward the optical axis of the photomultiplier. The general solution to this problem is to alter the light distribution from the crystal to the photomultipliers by modifications involving one or more of the crystal, light pipe or photomultiplier. A specific approach to the solution to this problem by modifying the light pipe is disclosed in U.S. Pat. No. 3,859,531 wherein optically coatedtransparent cones of the same material as the light pipe are inserted in conical recesses in the scintillator side of the light pipe within the volumetric projection of the photocathode of the photomultiplier tubes in the central region of the crystal. The coating on the cones is a thin layer of transparent material with an index of refraction considerably lower than that of the light pipe. The cones alter the distribution of light from light events occurring at various positions under each of the photomultiplier tubes in the central region such that the resultant response of the camera system shows considerably improved spatial linearity.

In order to practice this invention, it is necessary to accurately fashion the transparent cones and the conical recesses for receiving the cones in order for a good fit to be achieved. If the fit between a conical cone and the conical recess is not uniform throughout the region of contact between the cone and recess, the effect of the cone on light incident thereon will be angularly dependent thus introducing a further type of non-linearity.

It is therefore an object of the present invention to provide a new and improved nuclear imaging device which overcomes or substantiall reduces the deficiencies in the prior art devices.

SUMMARY OF THE INVENTION

According to the present invention, the light coupling means interposed between the photosensitive surfaces of an array of photodetectors and a scintillator crystal has a recess associated with at least one of the photodetectors, the recess lying within the volumetric projection of the photosensitive surface of said at least one of the photodetectors. The recess is filled with material having an index of refraction different from the index of refraction of the light coupling means such that the index throughout the recess is uniform.

The provision of the material with a different index in the recess serves to alter the direction of light from a light event in the crystal thereby modifying the relative amount of light received by each of the photodetectors of the array, and reducing spatial non-linearity. In one form of the invention, the material filling the recess is air and the recesses are located in the light coupling means closer to the photodetectors than to the crystal. Since only recesses are involved in this form of the invention, the problem associated with fitting cones into conical recesses is avoided. Furthermore, the conical surfaces can be made curved instead of straight.

In another form of the invention, the recess may be located closer to the scintillation crystal than the photodetectors, and in such case, the index of refraction of the material filling the recess should be higher than that of the light coupling means.

BRIEF DESCRIPTION OF THE DRAWINGS

Embodiments of the invention are illustrated in the accompanying drawing wherein:

FIG. 1 is a cross-section partly in section of the major components of an Anger-type detector into which the present invention is incorporated;

FIG. 2 is a top plan view of the gamma camera shown in FIG. 1;

FIG. 3 is an enlarged view of the embodiment of the invention shown in FIG. 1; and FIG. 4 is an enlarged view similar to FIG. 3 but showing a second embodiment of the invention.

DETAILED DESCRIPTION

Referring now to FIG. 1, reference numeral 10 designates an Anger-type gamma camera comprising scintillator crystal 1 responsive to radiation stimuli for producing light events at spatial locations corresponding to the location of the interaction between the stimuli and the crystal, a plurality of photomultiplier tubes indicated generally by reference numeral 9, and a transparent light coupling means 2 interposed between the photosensitive surface 30 of the photodetectors and crystal 1. A collimator (not shown) is normally associated with the crystal 1 adjacent the surface 8 through which radiation stimuli enter crystal 1. The light coupling means 2 is schematically shown in FIG. 1 as a single layer of material for the purpose of more easily illustrating the invention, although it should be understood that in an actual gamma camera, the light coupling means may be in the form of a plurality of layers of material of glass and plastic.

Nineteen photomultiplier tubes are shown in FIG. 2 arranged in a 3-4-5-4-3 hexagonal pattern as is conventional with Anger-type gamma cameras.

Referring now to FIG. 2, the periphery of the volumetric projection of the photosensitive surface 30 of each photomultiplier tube is shown by the circles 31. The volumetric projection of the photosensitive surface is thus a cylinder 32 as shown in FIG. 1 whose diameter is equal to the diameter of the photosensitive surface and whose height is the thickness of light coupling means 2. The projection of the photosensitive surface on the light coupling means thus excludes an annular region of the light coupling means surrounding the projection usually provided with grooves (not shown) on the surface 7 adjacent the photomultiplier tubes as is shown in U.S. Pat. No. 3,859,531.

Located within the projection of the photosensitive surface of the photomultiplier tubes is a surface 33 in the light coupling means defining a recess such as the recesses 20–24 shown in FIGS. 1 and 2. These recesses are located in the upper surface 7 of the light coupling means closer to the photomultipliers than to the crystal 1. A material fills the recesses such that the index of refraction throughout the recess is uniform and different from the index of refraction of the light coupling means. In the embodiment shown in FIG. 1, the material filling the recesses is air, which has an index of refraction substantially less than the index of refraction of the usual light coupling means 2 which is Plexiglass material. Alternatively, the recesses can be filled by other transparent materials having a lower index of refraction, such as optical compounds, optical greases, glasses, etc.

The recesses are preferably shaped to be symmetrical about an axis parallel to the axis of the photosensitive surfaces of photocathodes of the photomultiplier tubes as indicated in FIG. 2. Furthermore, it is preferred that the axis of symmetry pass through substantially the center of the axis of the photocathode with which the recess is associated. The location of the axis of symmetry with respect to the axis of the photomultiplier tube can be selected in accordance with the requirements for modifying the non-linearity of the camera in a beneficial way.

Referring to FIG. 1, a light event ocurring at location 3 in crystal 1 will cause light to be directed omnidirectionally from the light event. In the absence of recess 22, all of the light contained within the solid cone 34, whose apex is located at the light event and whose base is defined by the recess, would enter the photomultiplier 12. By reason of recess 22, however, a part of the light incident on the surface 33 defining the recess incident at an angle less than the critical angle will be diverted to other of the photomultipliers in the array. Thus, there is a significant reduction in the phenomenon of "hot spots" associated with the seven centrally located photomultiplier tubes.

The surface 33 defining a recess in the upper surface 7 of the light coupling means can be defined by straight line genetrices or by curved lines depending on the extent of the non-linearity. In an alternate arrangement, the recesses can be provided in the lower surface 8 of the light coupling means, i.e., the recesses can be located closer to the scintilator crystal than to the photocathodes of the photomultiplier tubes. In such case, the index of refraction of the material filling these recesses should be higher than that of the light coupling means. This latter arrangement is shown in FIG. 4 wherein the light coupling means 2A is provided with a spherical body 5 embedded in the light coupling means adjacent the surface 8A which faces scintillator crystal 1. Body 5 is of a material of a higher index of refraction than the light coupling means 2A.

What is claimed is:

1. In a nuclear imaging device having transparent light coupling means interposed between the photosensitive surfaces of an array of photodetectors and a scintillator crystal, the improvement of which comprises:
    (a) a surface in the light coupling means defining a recess associated with at least one photodetector, and located within the volumetric projection of its photosensitive surface; and
    (b) a material filling the recess such that the index of refraction throughout the recess is uniform and higher than the index of refraction of the light coupling means;
    (c) the recess being closer to the scintillator crystal than the photosensitive surface of said at least one photodetector.

2. The invention of claim 1 wherein the recess is spherical.

3. The invention of claim 1 wherein the recess is essentially cone-shaped with the apex thereof pointing toward the crystal.

4. The invention of claim 1 wherein the recess is essentially cone-shaped with the apex thereof pointing toward the photosensitive surface.

* * * * *